(12) United States Patent
Yeddu

(10) Patent No.: US 11,507,563 B2
(45) Date of Patent: Nov. 22, 2022

(54) UNSUPERVISED ANOMALY DETECTION

(71) Applicant: KYNDRYL, INC., New York, NY (US)

(72) Inventor: Dinesh Babu Yeddu, Guntur (IN)

(73) Assignee: Kyndryl, Inc., New York, NY (US)

( * ) Notice: Subject to any disclaimer, the term of this patent is extended or adjusted under 35 U.S.C. 154(b) by 425 days.

(21) Appl. No.: 16/550,413

(22) Filed: Aug. 26, 2019

(65) Prior Publication Data

US 2021/0064593 A1  Mar. 4, 2021

(51) Int. Cl.
- *G06F 16/23* (2019.01)
- *G06F 7/08* (2006.01)
- *G06F 16/28* (2019.01)

(52) U.S. Cl.
CPC .......... *G06F 16/2365* (2019.01); *G06F 7/08* (2013.01); *G06F 16/285* (2019.01)

(58) Field of Classification Search
CPC ...... G06F 16/2365; G06F 16/285; G06F 7/08; G06F 16/10; Y10S 707/99953
USPC ........................................................ 707/691
See application file for complete search history.

(56) References Cited

U.S. PATENT DOCUMENTS

| | | | | |
|---|---|---|---|---|
| 5,121,338 A | * | 6/1992 | Lodder | G01N 21/359 702/30 |
| 8,015,454 B1 | * | 9/2011 | Harrison | G06F 11/3419 714/47.3 |
| 8,473,474 B1 | * | 6/2013 | Eisenreich | G06N 7/005 705/37 |
| 9,317,829 B2 | | 4/2016 | Anand et al. | |
| 10,049,128 B1 | * | 8/2018 | Zhang | G06F 16/2365 |
| 10,261,851 B2 | | 4/2019 | Velipasaoglu et al. | |
| 10,338,982 B2 | * | 7/2019 | Qiao | G06F 17/18 |
| 10,579,932 B1 | * | 3/2020 | Cantrell | G06F 16/24568 |

(Continued)

OTHER PUBLICATIONS

Jiang et al., "A clustering-based method for unsupervised intrusion detections", Pattern Recognition Letters 27, 2006, pp. 802-810.

(Continued)

*Primary Examiner* — Hosain Talam
*Assistant Examiner* — Nicholas E Allen
(74) *Attorney, Agent, or Firm* — Erik Swanson; Matthew M. Hulihan; Heslin Rothenberg Farley & Mesiti PC

(57) ABSTRACT

Described are techniques for anomaly detection including a method comprising sorting a univariate data set in an numeric order and generating a second univariate data set based on the sorted univariate data set, where respective elements in the second univariate data set correspond to respective differences between consecutive elements in the sorted univariate data set. The method further comprises sorting the second univariate data set in numeric order and generating a third univariate data set that includes index values corresponding to respective differences in the sorted second univariate data set that are above a threshold. The method further comprises modifying the third univariate data set and defining a set of clusters based on the modified third univariate data set. The method further comprises clustering the sorted univariate data set according to the set of clusters and characterizing a new data point as anomalous in response to the clustering.

20 Claims, 6 Drawing Sheets

(56) References Cited

U.S. PATENT DOCUMENTS

| | | | | |
|---|---|---|---|---|
| 2014/0114707 | A1* | 4/2014 | Rope | G06Q 10/10 |
| | | | | 705/7.11 |
| 2014/0324752 | A1* | 10/2014 | Statnikov | G06F 17/18 |
| | | | | 706/46 |
| 2015/0243059 | A1* | 8/2015 | Matange | G06Q 30/00 |
| | | | | 345/440 |
| 2016/0350671 | A1* | 12/2016 | Morris, II | G06N 20/00 |
| 2017/0102678 | A1* | 4/2017 | Nixon | G05B 17/02 |
| 2017/0261645 | A1* | 9/2017 | Kleeman | G01W 1/10 |
| 2018/0241764 | A1* | 8/2018 | Nadolski | G06N 3/0481 |
| 2019/0007432 | A1* | 1/2019 | Tauschinsky | H04L 63/1425 |
| 2019/0034760 | A1 | 1/2019 | Narayanaswamy Chandrasekaran et al. | |
| 2019/0158524 | A1 | 5/2019 | Zadeh et al. | |
| 2019/0188212 | A1* | 6/2019 | Miller | G06N 7/005 |
| 2022/0036137 | A1* | 2/2022 | Muselli | G06K 9/6263 |

OTHER PUBLICATIONS

Liu et al., "Isolation-based Anomaly Detection", ACM Transactions on Knowledge Discovery from Data, Mar. 2012, 44 pages.
Leung et al., "Unsupervised Anomaly Detection in Network Intrusion Detection Using Clusters", NICTA Victoria Laboratory, Department of Computer Science and Software Engineering, 10 pages.
Mell et al., "The NIST Definition of Cloud Computing", Recommendations of the National Institute of Standards and Technology, Sep. 2011, 7 pages.

\* cited by examiner

UNSUPERVISED ANOMALY DETECTION

BACKGROUND

The present disclosure relates to anomaly detection, and, more specifically, to unsupervised anomaly detection using clusters.

Anomaly detection (also referred to as outlier detection) identifies rare, abnormal, and/or unexpected items, events, or observations in sets of data. Anomaly detection is relevant to numerous domains including quality control, performance monitoring, intrusion detection (e.g., in networks), fraud detection, and so on.

SUMMARY

Aspects of the present disclosure are directed toward a computer-implemented method comprising sorting a univariate data set in numeric order to generate a sorted univariate data set. The method further comprises generating a second univariate data set based on the sorted univariate data set, where respective elements in the second univariate data set correspond to respective differences between consecutive elements in the sorted univariate data set, and where the second univariate data set is indexed. The method further comprises sorting the second univariate data set in numeric order according to the respective differences to generate a sorted second univariate data set. The method further comprises generating a third univariate data set that includes index values corresponding to respective differences in the sorted second univariate data set that are above a threshold. The method further comprises modifying the third univariate data set by sorting the third univariate data set in numeric order and appending a first new value at an initial position of the third univariate data set and appending a second new value at a final position of the third univariate data set to generate a modified third univariate data set. The method further comprises defining a set of clusters based on the modified third univariate data set and clustering the sorted univariate data set according to the set of clusters. The method further comprises characterizing a new data point as anomalous in response to the clustering Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
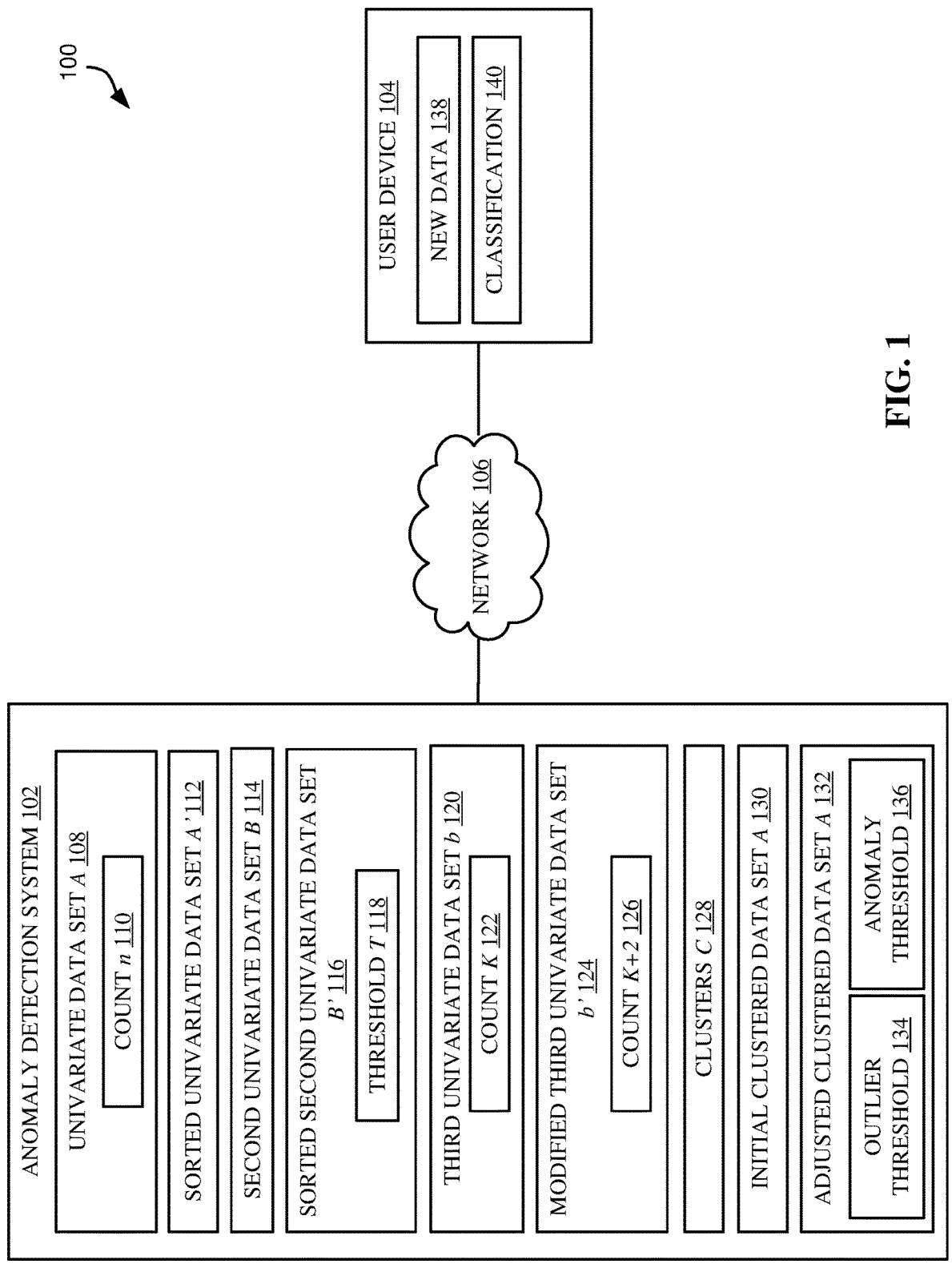
FIG. 1 illustrates a block diagram of an example computing environment for detecting anomalies, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward anomaly detection, and, more specifically, to unsupervised anomaly detection using clusters. While not limited to such applications, embodiments of the present disclosure may be better understood in light of the aforementioned context.

Many traditional anomaly detection techniques compare input data to a baseline having an upper-bound and a lower-bound, where input data above the upper-bound or below the lower-bound are considered anomalous. These techniques include, for example, box plots, normalized z-scores, Attribute Value Frequency (AVF), control limits, and others. However, these techniques are inadequate to identify inter-range anomalous behavior. Further, many traditional anomaly detection techniques, such as normalized z-scores, require the underlying data population to follow a normalized distribution. However, this is not always the case. Finally, many cluster-based anomaly detection techniques require supervised training such as Density-Based Spatial Clustering of Applications with Noise (DBSCAN) with Local Outlier Factor (LOF) scores. Aspects of the present disclosure overcome these and other deficiencies insofar as aspects of the present disclosure can detect inter-range anomalous behavior, do not rely upon a normalized distribution of underlying data, and do not require supervised training.

Aspects of the present disclosure provide a method of improved anomaly detection. The improved anomaly detection techniques discussed herein can generally include steps of (1) sorting a univariate data set (e.g., a data set involving a single variable) in numeric order to generate a sorted univariate data set. The improved anomaly detection techniques can further include (2) generating a second univariate data set based on the sorted univariate data set, where respective elements in the second univariate data set correspond to respective differences between consecutive elements in the sorted univariate data set, and where the second univariate data set is indexed. The improved anomaly detection techniques can further include (3) sorting the second univariate data set in numeric order according to the respective differences and (4) generating a third univariate data set that includes index values corresponding to respective differences in the sorted second univariate data set that are above a threshold. The improved anomaly detection techniques can further include (5) modifying the third univariate data set by sorting the third univariate data set in numeric order and appending a first new value at an initial position of the third univariate data set and appending a second new value at a final position of the third univariate data set to generate a modified third univariate data set. The improved anomaly detection techniques can further include (6) defining a set of clusters based on the modified third univariate data set and (7) clustering the sorted univariate data set according to the set of clusters. Finally, the improved anomaly detection techniques can further include (8) characterizing a new data point as anomalous in response to the clustering.

The anomaly detection techniques discussed herein realize numerous improvements in the field of anomaly detection, including, but not limited to:

(i) Unsupervised: The present disclosure can ingest unlabeled, univariate data and generate a clustering model capable of accurately classifying anomalous and non-anomalous data points. The training data does not need to be classified as anomalous or non-anomalous. Further, cluster parameters such as cluster size or cluster ranges do not need to be manually defined.

(ii) Computationally Efficient: The present disclosure does not rely upon complex machine learning or deep learning models. Instead, the present disclosure follows a computationally efficient clustering technique to cluster univariate data in a manner useful for classifying new data as anomalous or non-anomalous.

(iii) Auto-Adjusting: The present disclosure is capable of automatically adjusting data clusters as additional data becomes available in approximately real-time. As a result, aspects of the present disclosure can improve/adapt the clustering techniques to improve accuracy in anomaly detection over time.

(iv) Autonomous: The present disclosure is capable of independently identifying clusters and cluster sizes. In contrast, many traditional approaches require a user to define a cluster-size or number of elements per cluster. The present disclosure can automatically generate a variable number of clusters of variable size according to the training data.

(v) Distribution-Agnostic: The present disclosure is capable of clustering data and identifying anomalous data from populations which follow any one of a number of distributions, such as a normal distribution, a binomial distribution, a hypergeometric distribution, a Poisson distribution, a Skellam distribution, and/or other distributions.

In light of the numerous advantages and improvements that can be realized the present disclosure, the anomaly detection techniques discussed herein are applicable to a variety of fields including, but not limited to, Internet Technology (IT) support, quality control, performance monitoring, cybersecurity, environmental analysis, Internet of Things (IoT) monitoring, and the like.

For example, in an IT support environment, it may be useful to input call volume, help ticket generation, resolution time (e.g., Mean Time Taken to Resolve (MTTR)), or a different variable on an hourly, daily, or weekly basis. Aspects of the present disclosure can then identify an anomaly, where the anomaly may indicate a new, pervasive IT support issue causing an abnormal increase in call volume, help ticket generation, resolution time, or another variable.

As another example, in a quality control environment, it may be useful to input one or several dimensions from a manufactured part into the anomaly detection system. Aspects of the present disclosure can identify an anomaly corresponding to a manufactured part that may be dimensionally out-of-tolerance or otherwise abnormal relative to the other manufactured parts.

As another example, in a performance monitoring environment, biological data such as heart rate, blood pressure, body temperature, or other biological measures can be input to the anomaly detection system. Aspects of the present disclosure can identify an anomalous data point which may indicate a health risk (e.g., heart attack, stroke, etc.).

As another example, in a cybersecurity environment, network traffic data can be input to the anomaly detection system. Aspects of the present disclosure can identify an anomalous data point or data points which may indicate a possible cyberattack on the network.

As another example, in an environmental analysis environment, atmospheric data such as temperature, barometric pressure, wind speed, etc. can be input to the anomaly detection system. Aspects of the present disclosure can identify an anomalous data point which may indicate a possible weather event.

As another example, in an IoT environment, sensor data from hundreds or thousands of sensors can be input to the anomaly detection system. Aspects f the present disclosure can identify an anomalous data point which may indicate a malfunctioning sensor requiring servicing or replacement.

The above examples are non-limiting examples intended to illustrate the diversity of applications that may benefit from various aspects of the present disclosure. As shown in the above example applications, and in light of the aforementioned example advantages, aspects of the present disclosure can provide performance enhancements to numerous applications in numerous industries as a result of accurate anomaly detection using a lightweight anomaly detection model.

Referring now to the figures, FIG. 1 illustrates a block diagram of an example computing environment 100 for identifying anomalous data, in accordance with some embodiments of the present disclosure. Computing environment 100 includes an anomaly detection system 102 communicatively coupled to a user device 104 via a wired or wireless network 106. Anomaly detection system 102 can be configured to train a model for classifying data as anomalous or non-anomalous. Further, user device 104 can provide data for classification to anomaly detection system 102 using network 106.

Anomaly detection system 102 includes a univariate data set, A 108 have a count n 110 indicating the number of elements in the univariate data set, A 108. Univariate data set, A 108 can be used as training data for anomaly detection system 102.

Anomaly detection system 102 further includes a sorted univariate data set, A' 112. In some embodiments, the sorted univariate data set, A' 112 is the univariate data set, A 108 sorted from relatively lower values to relatively higher values (e.g., sorted in ascending order, though any numeric order is possible).

Anomaly detection system 102 further includes a second univariate data set, B 114. Each element in the second univariate data set, B 114 is determined by subtracting a previous element from a current element for each element beginning with the second element in the sorted univariate data set A' 112. For example, the first element in the second univariate data set, B 114 is the second element in the sorted univariate data set, A' 112 minus the first element in the sorted univariate data set, A' 112. Likewise, the second element in the second univariate data set, B 114 is the third element in the sorted univariate data set, A' 112 minus the second element in the sorted univariate data set, A' 112. Thus, the second univariate data set, B 114 includes a number of elements that is one less than count n 110 (e.g., n-1). Further, the second univariate data set, B 114 can be indexed from 1 (corresponding to the first element in the second univariate data set, B 114) to n-1 (corresponding to the final element in the second univariate data set, B 114). When indexed, the elements of the second univariate data set, B 114 can be represented in a tuple form of (difference value, index value), or vice versa.

Anomaly detection system 102 further includes a sorted second univariate data set, B' 116 that is sorted from lesser difference values to higher difference values (e.g., ascending order, or any numeric order) based on the difference values in the second univariate data set, B 114. The sorted second univariate data set, B' 116 is associated with a threshold, T 118. In some embodiments, the threshold, T 118 is the difference value of the median element of the sorted second univariate data set, B' 116. Although a median value is provided as an example, other statistical measures are also possible and within the spirit and scope of the present disclosure.

Anomaly detection system 102 further includes a third univariate data set, b 120 including the index numbers corresponding to the values that are above the threshold, T 118 in the sorted second univariate data set, B' 116. The third univariate data set, b 120 includes a count K 122 indicating the number of elements in the third univariate data set, b 120. In some embodiments where the threshold, T 118 is a median value, then the count K 122 is less than or equal to half of count n 110 (e.g., n/2) rounded to the nearest integer.

Anomaly detection system 102 further includes a modified third univariate data set, b' 124 that is the third univariate data set, b 120 sorted in ascending order (or any numeric order) and including a new initial element of 0 appended to the front of the third univariate data set, b 120 and a new final element of count n 110 appended to the end of the third univariate data set, b 120. As a result, the modified third univariate data set, b' 124 includes a number of elements having a count K+2 126.

Anomaly detection system 102 further includes clusters, C 128 indicating a number of clusters and a number of elements in each cluster for the sorted univariate data set, A' 112. In some embodiments, clusters, C 128 is based on consecutive differences between a previous element and a current element of the modified third univariate data set, b' 124. In some embodiments, the number of elements in clusters, C 128 is K+1, where the number of elements in clusters, C 128 corresponds to the number of clusters that will be used to cluster the sorted univariate data set, A' 112. Further, the value of each element in clusters, C 128 corresponds to a size of that cluster. In other words, the value of each element in clusters, C 128 indicates a number of elements from sorted univariate data set A' 112 that will be included in that respective cluster. As a result, the number of clusters is based on the number of elements in clusters, C 128 and the size of each cluster is based on the value of each element in clusters, C 128 (where the value of each element is based on a difference between consecutive elements of the modified third univariate data set, b' 124).

Anomaly detection system 102 further includes an initial clustered data set, A 130 that is the sorted univariate data set, A' 112 clustered according to clusters, C 128. Initial clustered data set, A 130 is clustered into a number of clusters corresponding to the number of elements in clusters, C 128 (e.g., K+1). Each cluster can include a number of elements from sorted univariate data set, A' 112 corresponding to the value of the element in clusters, C 128 corresponding to that cluster.

Anomaly detection system 102 further includes an adjusted clustered data set, A 132 that includes equal or fewer clusters than clusters C 128 in initial clustered data set, A 130 according to an outlier threshold 134. In some embodiments, the adjusted clustered data set, A 132 is configured to remove any cluster in initial clustered data set A 130 that is (1) a cluster with a single element; and (2) outside of the outlier threshold 134 from any adjacent cluster. Further, the adjusted clustered data set A 132 merges any cluster in initial clustered data set A 130 that is (1) a cluster with a single element; and (2) within the outlier threshold 134 of an adjacent cluster. In some embodiments, these clusters are merged with the nearest adjacent cluster. In some embodiments, outlier threshold 134 is based on a statistic associated with each respective cluster, such as 1.5 standard deviations of a given cluster added to a maximum value of the given cluster and subtracted from a minimum value of the given cluster. In some embodiments, the outlier threshold 134 comprises less than two standard deviations of a given cluster.

Adjusted clustered data set A 132 further includes an anomaly threshold 136. Anomaly threshold 136 can be added to a maximum value of each cluster and subtracted from a minimum value of each cluster in adjusted clustered data set A 132 to provide a range for each cluster that constitutes non-anomalous data. Thus, adjusted clustered data set A 132 together with anomaly threshold 136 constitutes a trained model that is useful for differentiating anomalous data from non-anomalous data.

In some embodiments, user device 104 receives, generates, or accesses new data 138 that is similar to data contained in univariate data set, A 108. User device 104 can provide the new data 138 to anomaly detection system 102 via network 106. Anomaly detection system 102 can compare the new data 138 to adjusted clustered data set A 132 and anomaly thresholds 136. If the new data 138 is a value that falls within any cluster of adjusted clustered data set A 132, then the new data 138 is classified as non-anomalous. If the new data 138 is a value that falls outside of any cluster of adjusted clustered data set A 132, but the value of the new data 138 is within an anomaly threshold 136 of a minimum or maximum value of at least one cluster of adjusted clustered data set A 132, then the new data 138 is classified as non-anomalous. If the new data 138 is outside of each cluster in adjusted clustered data set A 132 and further outside of any extended range provided by each cluster in adjusted clustered data set A 132 using anomaly threshold 136, then the new data 138 is classified as anomalous.

Depending on the relationship between new data 138 to adjusted clustered data set A 132 and anomaly threshold 136, the new data 138 is associated with a classification 140, where the classification can be anomalous or non-anomalous. In some embodiments, the classification 140 is associated with a probability, certainty, or other indicator quantifying the degree of abnormality.

FIG. 1 is a non-limiting example of some embodiments of the present disclosure. Some embodiments of the present disclosure can utilize more components, fewer components, and/or different components than the components shown in FIG. 1. Further, some embodiments of the present disclosure can utilize components having different names but similar functionality. Further still, in some embodiments, various components can be incorporated into one another or further separated from one another. For example, in some embodiments, anomaly detection system 102 can be incorporated into user device 104 (e.g., the instructions for implementing anomaly detection system 102 can be provided to user device 104 via network 106 so that user device 104 can implement the functionality of anomaly detection system 102). These and other modifications, alternatives, and variations fall within the spirit and scope of the present disclosure.

Figure 2:
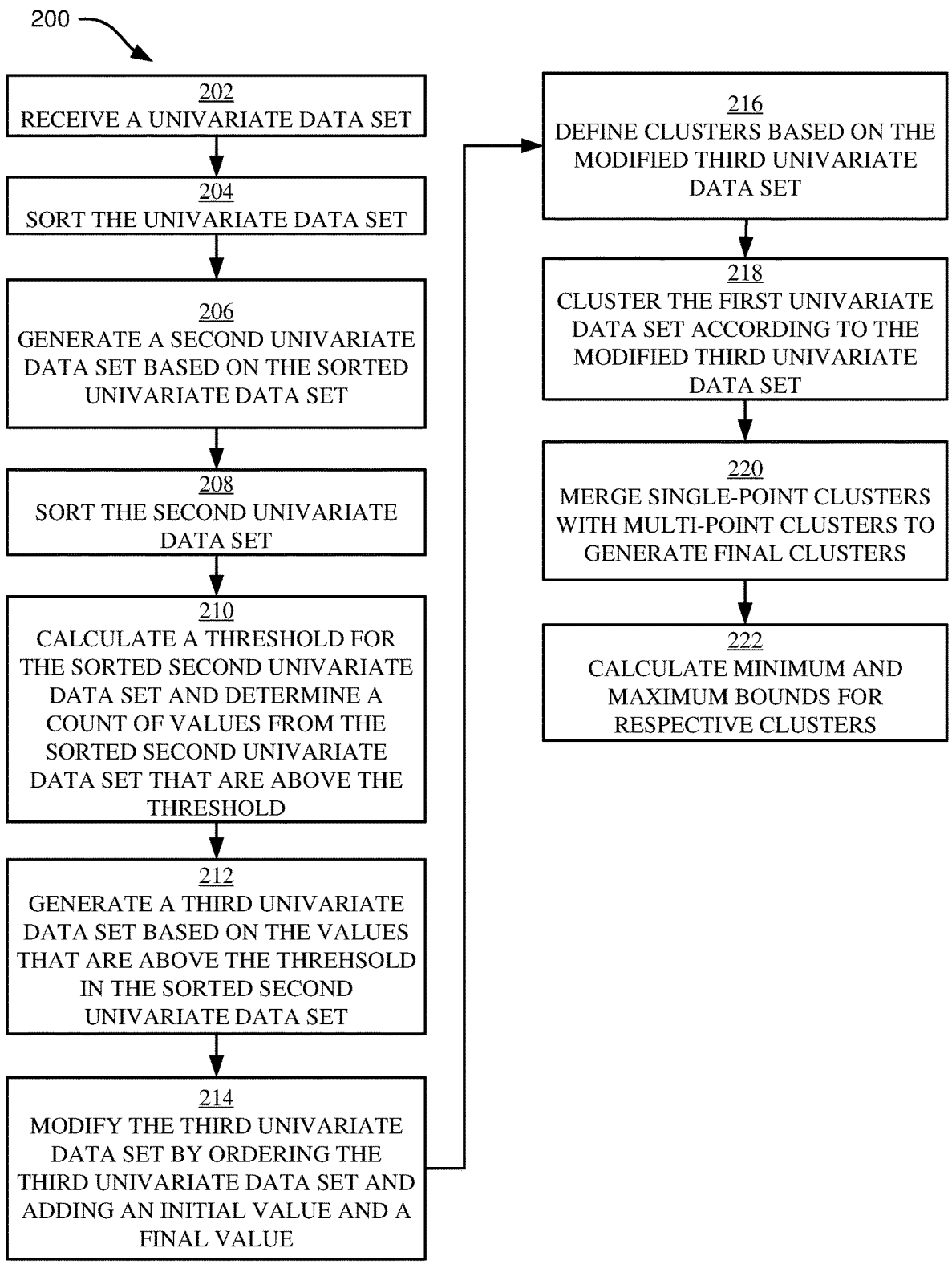
FIG. 2 illustrates a flowchart of an example method for clustering data for anomaly detection, in accordance with some embodiments of the present disclosure.

FIG. 2 illustrates a flowchart of an example method 200 for detecting anomalies. In some embodiments, the method 200 is implemented by an anomaly detection system 102, a user device 104, or a different configuration of hardware and/or software.

Operation 202 includes receiving a univariate data set, A 108. The univariate data set A, 108 can include a list of any number (e.g., count n 110) of integer-formatted numbers or float-formatted numbers. The univariate data set, A 108 can be, for example, daily ticket volumes, daily or weekly MTTR values, temperatures (or other atmospheric measurements), user login counts, monthly sales, biological data, computer systems data, network data, and so on. In some embodiments, the univariate data set, A 108 is received at an anomaly detection system 102.

As one example, univariate data set, A 108 can be:

Example Univariate Data Set: A=[60, 70, 80, 1, 2, 3, 100, 220, 230, 250]

The example discussed above is purely for illustration and is non-limiting. Some embodiments of the present disclosure can be useful for a larger univariate data set, A 108 such as one containing hundreds, thousands, or millions of data points.

Operation 204 includes sorting the univariate data set, A 108 received in operation 202 to generate a sorted univariate data set, A' 112. In some embodiments, operation 204 includes sorting the univariate data set, A 108 in ascending order (e.g., from a lowest element to a largest element to generate the sorted univariate data set, A' 112, or any other numeric order).

Continuing the above example, sorted univariate data set, A' 112 can be:

Sorted Univariate Data Set: A'=[1, 2, 3, 60, 70, 80, 100, 220, 230, 250]

Operation 206 includes, generating a second univariate data set, B 114 that is based on the sorted univariate data set, A' 112. The second univariate data set, B 114 can be generated by subtracting each element in the sorted univariate data set, A' 112 from the next consecutive element in the sorted univariate data set, A' 112, and indexing the differences (e.g., associating an identifier to each difference, where the identifier is an integer beginning at 1 for the first element in the second univariate data set, B 114 and ending at n−1 for the last element in the second univariate data set, B 114). Thus, the second univariate data set, B 114 can include tuples in the form of (difference value, index value), or vice versa, where the number of tuples is one less than the number of elements in the univariate data set, A 108 (e.g., n−1).

Continuing the above example, second univariate data set, B 114 can be:

Second Univariate Data Set: B=[(1,1), (1,2), (57, 3), (10, 4), (10, 5), (20, 6), (120, 7), (10, 8), (20, 9)]]

As previously discussed, the example of the second univariate data set, B 114 shown above includes tuples in the form of (difference value, index value), where the first value is based on the difference between consecutive values in the sorted univariate data set, A' 112 and where the second value is the index value. As shown in the example above, the second univariate data set, B 114 is indexed in ascending order (or any other numeric order).

Operation 208 includes sorting the second univariate data set, B 114 based on the difference values (rather than the index values) to generate a sorted second univariate data set, B' 116. In some embodiments, the second univariate data set, B 114 is sorted in ascending order (or any other numeric order) by difference values to generate a sorted second univariate data set, B' 116. Continuing the above example, the sorted second univariate data set, B' 116 can be:

Sorted Second Univariate Data Set: B'=[(1,1), (1,2), (10, 4), (10, 5), (10, 8), (20, 6), (20, 9), (57, 3), (120, 7)]]

Operation 210 includes calculating a threshold, T 118 of the sorted second univariate data set, B' 116. In some embodiments, the threshold, T 118 is a median of difference values of the sorted second univariate data set, B' 116.

Continuing the above example, the threshold, T 118 for the sorted second univariate data set, B' 116 can be 10 because 10 is the median of the sorted second univariate data set, B' 116. In situations where there are an even number of tuples in the sorted second univariate data set, B' 116 (and there is no explicit median value), then the median can be calculated as the average of the difference values of the two tuples on either side of the hypothetical median point.

Although median is discussed above, other statistical measures are also possible and within the spirit and scope of the present disclosure. For example, an average of all values, or an average of a subset of values (e.g., an average of the three middle values) can be used. As another example, the standard deviation of all values, or a standard deviation of a subset of values, can be used. Further, although operation 210 discusses calculating the threshold, T 118 according to the sorted second univariate data set, B' 116, the threshold, T 118 can also be calculated directly from the second univariate data set, B 114. Other known or customized statistical expressions based on all of, or part of, the second univariate data set, B 114 are also within the spirit and scope of the present disclosure.

Operation 210 can further include determining a count, K 122 of values from the sorted second univariate data set, B' 116 that are above the threshold, T 118. Continuing the above example, the count, K 122 is 4 since there are 4 tuples above the threshold, T 118 in the sorted second univariate data set, B' 116.

Operation 212 includes generating a third univariate data set, b 120 including the index numbers of each of the count, K 122 difference values that are above the threshold, T 118 from operation 210.

Continuing the above example, the third univariate data set, b 120 can be:

Third Univariate Data Set: b=[6, 9, 3, 7]

The third univariate data set, b 120 can include 6, 9, 3, and 7 as those are the index values corresponding to the count, K 122 (e.g., 4) tuples that have a difference value above the threshold, T 118 (e.g., 10).

Operation 214 includes modifying the third univariate data set, b 120 to create a modified third univariate data set, b' 124, where the modified third univariate data set, b' 124 is sorted from low to high (e.g., ascending order, or any other numeric order) and includes a zero appended prior to the initial element, and further includes a value of n (i.e., the count n 110 of the first univariate data set, A 108) appended after the final element in the third univariate data set, b 120. This results in the number of elements in the modified third univariate data set, b' 124 having a count K+2 126.

Continuing the example above, the modified third univariate data set, b' 124, can be:

Modified Third Univariate Data Set: b'=[0, 3, 6, 7, 9, 10]

Operation 216 includes defining clusters, C 128. In some embodiments, K+1 clusters are formed, where each of the clusters has a size defined by a difference between consecutive elements of the modified third univariate data set, b' 124. Continuing the above examples, clusters, C 128 can be:

Clusters: C=[3, 3, 1, 2, 1]

As can be seen above, the first cluster size of 3 corresponds to 3-0, the second cluster size of 3 corresponds to 6-3, the third cluster size of 1 corresponds to 7-6, the fourth cluster size of 2 corresponds to 9-7, and the fifth cluster size of 1 corresponds to 10-9. Thus, the number of elements in clusters, C 128 indicates the number of clusters. Further, the value of each element in clusters, C 128 indicates the number of elements from sorted univariate data set, A' 112 that are contained in that cluster. For example, the value of the first element in clusters, C 128 is 3, therefore, the first 3 elements from sorted univariate data set, A' 112 are included in the first cluster.

Operation 218 includes clustering the sorted first univariate data set, A' 112 according to the clusters, C 128 to generate initial clustered data set, A 130. Continuing the example above, initial clustered data set, A 130, can be:

Initial Clustered Data Set=[[1, 2, 3], [60, 70, 80], [100], [220, 230], [250]]

Operation 220 includes merging any single-point clusters with multi-point clusters if the single-point clusters are within an outlier threshold 134 (e.g., 1.5*the standard deviation (SD) of any multi-point cluster) from any adjacent cluster. In the event that a single-point cluster is not within the outlier threshold 134 of any adjacent multi-point cluster, the single-point cluster can be considered a training outlier and removed from the initial clustered data set, A 130. In some embodiments, such single-point clusters are also tagged as anomalous. Alternatively, if a single-point cluster is within the outlier threshold 134 of two or more multi-point clusters, then the single-point cluster can be added to an adjacent multi-point cluster that is closest in value to the single-point cluster. Operation 220 can result in generation of adjusted clustered data set, A 132 based on outlier threshold 134.

Continuing the example above, the adjusted clustered data set, A 132 can be:

Adjusted Clustered Data Set=[[1, 2, 3], [60, 70, 80], [220, 230]]

As can be seen in the above example, single-point clusters [100] and [250] are both removed in the adjusted clustered data set, A 132 because neither is within 1.5 standard deviations of any adjacent multi-point cluster. For example, the standard deviation of cluster [220, 230] is 7.07, and 1.5*7.07 is 10.6. Since single-point cluster [250] is not within 10.6 of (the nearer value of the multi-point cluster), then [250] is not merged into the cluster [220, 230], and [250] is removed. Likewise, regarding single-point cluster [100], the standard deviation of adjacent multi-point cluster [60, 70, 80] is 10, and 1.5*10 equals 15. The difference between single-point cluster [100] and the nearest value of cluster [60, 70, 80] is 20, which is larger than 15. Therefore, single-point cluster [100] is not incorporated into cluster [60, 70, 80]. Further, single-point cluster [100] is also not within 10.6 of the nearest value of the other adjacent multi-point cluster [220, 230]. For these reasons, single-point cluster [100] is removed from the data set rather than appended to an adjacent multi-point cluster.

Operation 222 includes calculating anomaly thresholds 136 for respective clusters in adjusted clustered data set A 132. Anomaly thresholds 136 include minimum and maximum bounds for respective clusters. Upper and lower bounds can respectively be defined as a maximum value for a given cluster plus anomaly threshold 136 (upper bound) and a minimum value for a given cluster minus anomaly threshold 136 (lower bound). The anomaly threshold 136 can be the same or different between the upper and lower bound. Likewise, the anomaly threshold 136 can be the same or different between respective clusters. In some embodiments, anomaly thresholds 136 are based on a statistical measure of each cluster such as, but not limited to, standard deviation, variance, average, and so on.

As an example, anomaly threshold 136 can be based on a standard deviation of each cluster. Thus, the first cluster in the example adjusted clustered data set, A 132 is [1, 2, 3]. The standard deviation of this cluster is 1. Thus, the anomaly threshold 136 for the first cluster could result in values lower than 0 (e.g., 1−1=0) or values larger than 4 (e.g., 3+1=4) being excluded from the first cluster. In contrast, a value between 0 and 4 would be considered to be within the first cluster. In various embodiments, the ranges of anomaly thresholds 136 can be inclusive or exclusive.

Extending the above example, the standard deviation for the second cluster is 10 and the standard deviation for the third cluster is 7.07. Thus, a new data 138 that falls within any range of 0-4 (first cluster), 50-90 (second cluster), or 212.93-237.07 (third cluster) is considered non-anomalous. If new data 138 does not fall within any of the above ranges (e.g., cluster minimum values minus anomaly threshold 136 and cluster maximum values plus the anomaly threshold 136), then the new data 138 can be considered anomalous. For example, a new data 138 value of 166 or 5 is anomalous because it does not fall within any of the above ranges. Conversely, a new data 138 value of 232 is non-anomalous because it falls within the third cluster's range.

Operations 202-222 result in a trained model insofar as the adjusted clustered data set, A 132 can be used to determine whether new data 138 is anomalous or non-anomalous data based on how similar or dissimilar the new data 138 is to any of the clusters in adjusted clustered data set, A 132 in light of anomaly thresholds 136. This is discussed in more detail with respect to FIG. 3. Further, although not explicitly shown in FIG. 2, the method 200 can further include receiving additional data and proceeding again through operations 202-222 to update the trained model in approximately real-time.

Figure 3:
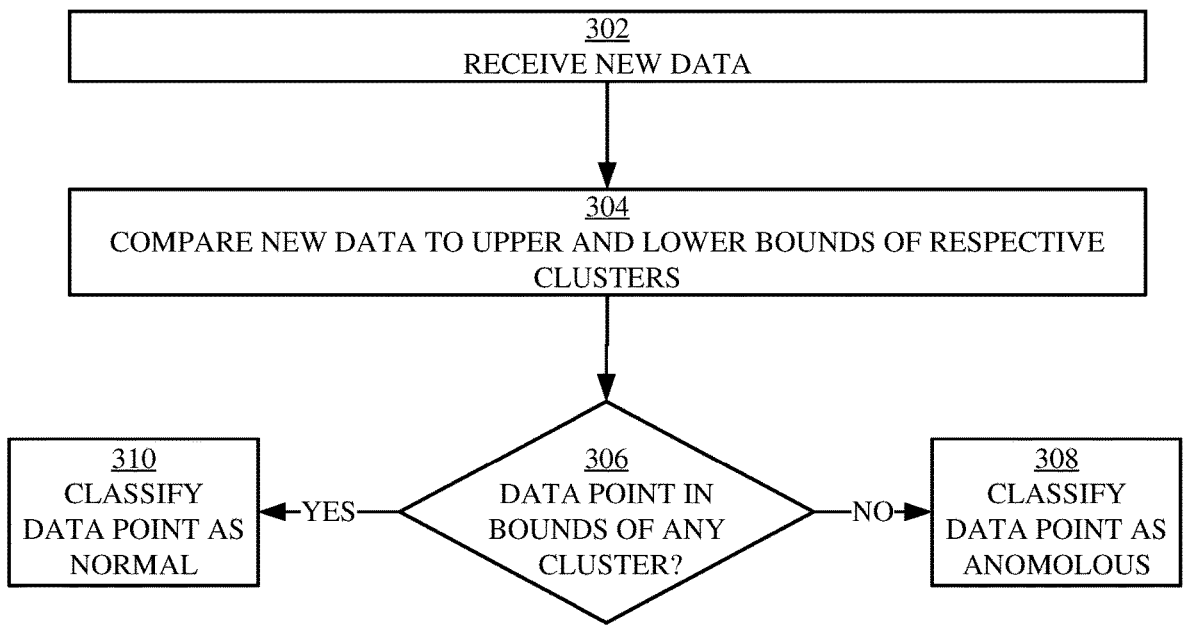
FIG. 3 illustrates a flowchart of an example method for detecting anomalies, in accordance with some embodiments of the present disclosure.

FIG. 3 illustrates a flowchart of an example method 300 for characterizing a newly received data point as anomalous or non-anomalous, in accordance with embodiments of the present disclosure. The method 300 can be performed by anomaly detection system 102, user device 104, or a different configuration of hardware and/or software. In some embodiments, the method 300 is performed after the method 200 of FIG. 2.

Operation 302 includes receiving new data 138. In some embodiments, new data 138 is received at user device 104 or generated by user device 104. Operation 304 includes comparing the new data 138 to anomaly thresholds 136 of respective clusters in adjusted clustered data set A 132. Operation 306 includes determining if the new data 138 is within any bound of any cluster. If so, (306: YES), then the method 300 proceeds to operation 310 and classifies the new data 138 as non-anomalous, expected, normal, or another equivalent indicator. If not, (306: NO), then the method 300 proceeds to operation 308 and classifies the new data 138 as anomalous, unexpected, abnormal, or another equivalent indicator. Each of operations 308 and 310 can include associating the new data 138 with a classification 140 indicating, quantifying, explaining, or otherwise identifying the new data 138 as anomalous or non-anomalous. In some embodiments, the classification 140 is associated with a probability, a certainty, and/or a confidence related to the accuracy of the classification 140.

Figure 4:
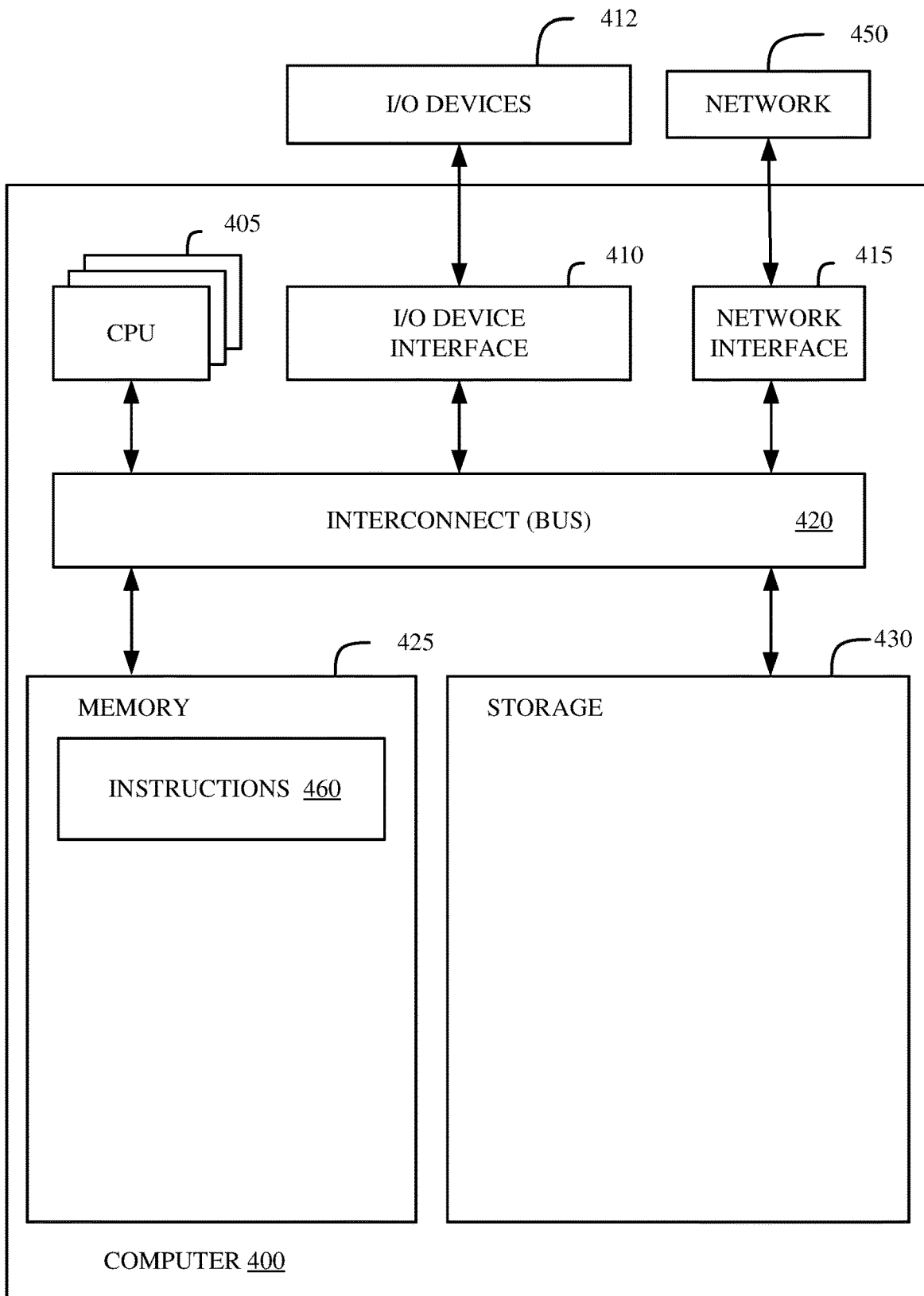
FIG. 4 illustrates a block diagram of an example computer, in accordance with some embodiments of the present disclosure.

FIG. 4 illustrates a block diagram of an example computer 400 in accordance with some embodiments of the present disclosure. In various embodiments, computer 400 can perform the methods described in FIGS. 2-3 and/or implement the functionality discussed in FIG. 1. In some embodiments, computer 400 receives instructions related to the aforementioned methods and functionalities by downloading processor-executable instructions from a remote data processing system via network 450. In other embodiments, computer 400 provides instructions for the aforementioned methods and/or functionalities to a client machine such that the client machine executes the method, or a portion of the method, based on the instructions provided by computer 400. In some embodiments, the computer 400 is incorporated into one or more of the anomaly detection system 102 and/or the user device 104.

Computer 400 includes memory 425, storage 430, interconnect 420 (e.g., BUS), one or more CPUs 405 (also referred to as processors herein), I/O device interface 410, I/O devices 412, and network interface 415.

Each CPU 405 retrieves and executes programming instructions stored in memory 425 or storage 430. Interconnect 420 is used to move data, such as programming instructions, between the CPUs 405, I/O device interface 410, storage 430, network interface 415, and memory 425. Interconnect 420 can be implemented using one or more busses. CPUs 405 can be a single CPU, multiple CPUs, or a single CPU having multiple processing cores in various embodiments. In some embodiments, CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random-access memory (e.g., static random-access memory (SRAM), dynamic random access memory (DRAM), or Flash). Storage 430 is generally included to be representative of a non-volatile memory, such as a hard disk drive, solid state device (SSD), removable memory cards, optical storage, or flash memory devices. In an alternative embodiment, storage 430 can be replaced by storage area-network (SAN) devices, the cloud, or other devices connected to computer 400 via I/O device interface 410 or network 450 via network interface 415.

In some embodiments, memory 425 stores instructions 460. However, in various embodiments, instructions 460 are stored partially in memory 425 and partially in storage 430, or they are stored entirely in memory 425 or entirely in storage 430, or they are accessed over network 450 via network interface 415.

Instructions 460 can be processor-executable instructions for performing any portion of, or all of, any of the methods of FIGS. 2-3 and/or implementing any of the functionality discussed in FIG. 1.

In various embodiments, I/O devices 412 include an interface capable of presenting information and receiving input. For example, I/O devices 412 can present information to a user interacting with computer 400 and receive input from the user.

Computer 400 is connected to network 450 via network interface 415. Network 450 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
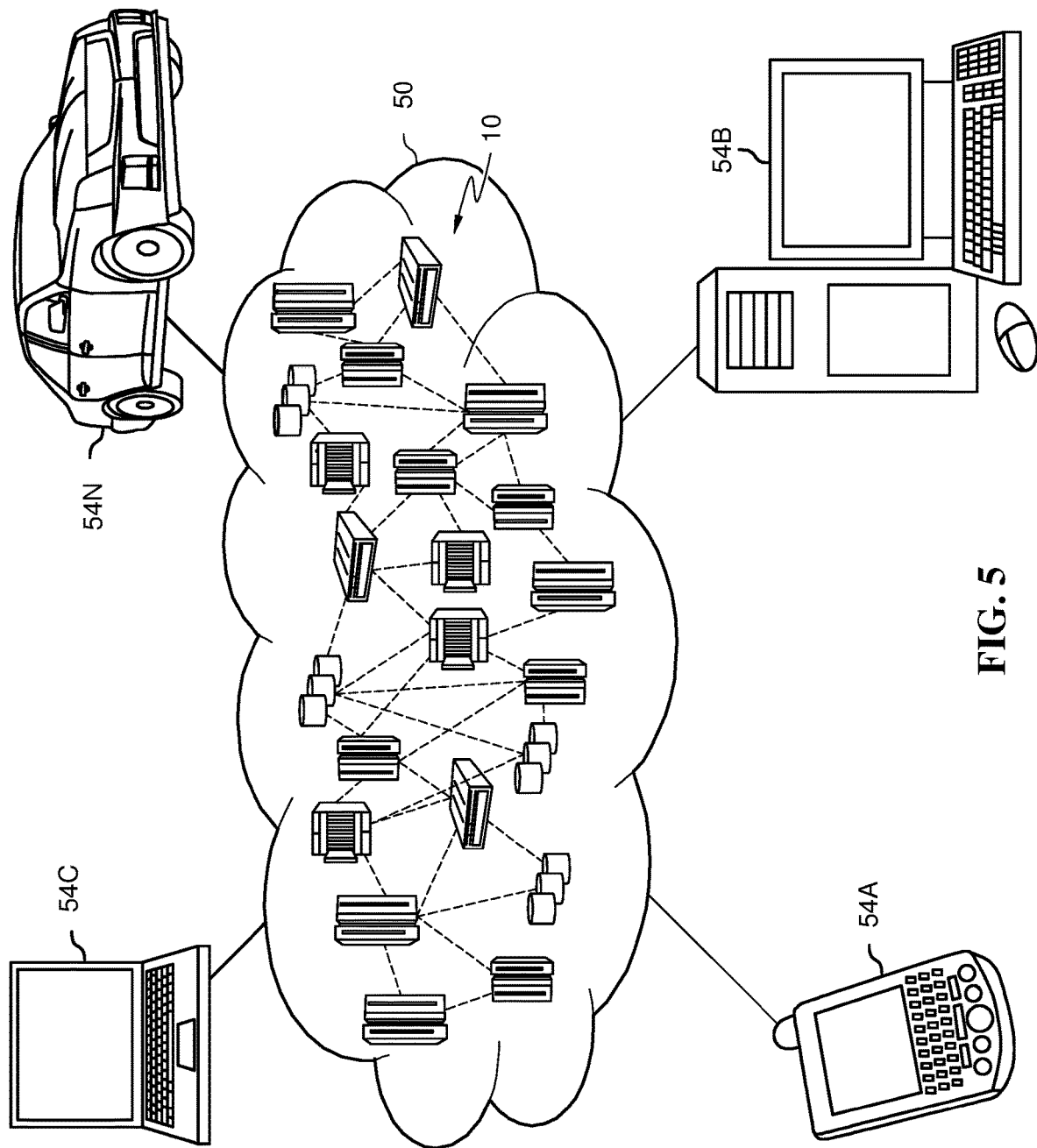
FIG. 5 depicts a cloud computing environment, in accordance with some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
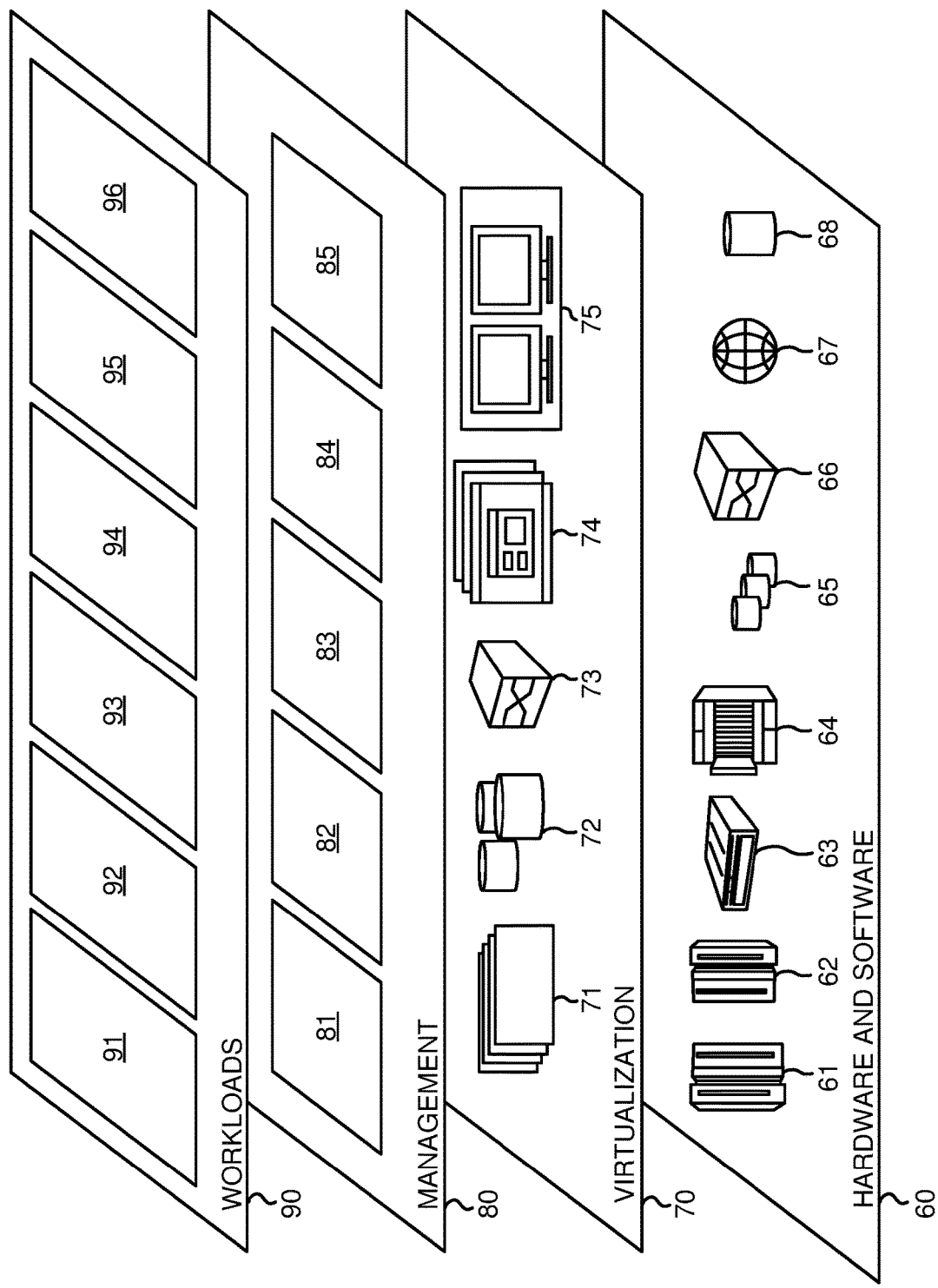
FIG. 6 depicts abstraction model layers, in accordance with some embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 460 of FIG. 4 and/or any software configured to perform any subset of the methods described with respect to FIGS. 2-3 and/or any of the functionality discussed in FIG. 1) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method comprising:
generating a clustering model based on unsupervised learning, the clustering model for data point classification, and the generating comprising:
sorting a univariate data set, comprising n number of elements, in numeric order to generate a sorted univariate data set;
generating a second univariate data set, comprising fewer than n number of elements, based on the sorted univariate data set, wherein respective elements in the second univariate data set correspond to respective differences between consecutive elements in the sorted univariate data set, and wherein the second univariate data set is indexed;
sorting the second univariate data set in numeric order according to the respective differences to generate a sorted second univariate data set;
generating a third univariate data set that includes index values corresponding to respective differences in the sorted second univariate data set that are above a threshold;
modifying the third univariate data set by sorting the third univariate data set in numeric order appending a first new value at an initial position of the third univariate data set, the first new value being 0, and appending a second new value at a final position of the third univariate data set, the second new value being n, to generate a modified third univariate data set comprising values of the third univariate data set as well as the appended first new value and second new value;
defining a set of clusters based on the modified third univariate data set; and
clustering the sorted univariate data set according to the set of clusters;
wherein the generating the clustering model is independent of whether the univariate data set is classified as anomalous or non-anomalous, and
using the generated clustering model in characterizing a new data point as anomalous.

2. The method of claim 1, wherein the threshold is a median of difference values of the sorted second univariate data set.

3. The method of claim 1, wherein the second univariate data set stores each element in a format of (difference value, index value).

4. The method of claim 1, wherein the second univariate data set comprises n−1 elements.

5. The method of claim 4, wherein the third univariate data set comprises K elements, and wherein the modified third univariate data set comprises K+2 elements.

6. The method of claim 5, wherein the set of clusters includes K+1 clusters.

7. The method of claim 5, wherein the K elements is less than or equal to n/2.

8. The method of claim 1, wherein clustering the sorted univariate data set according to the modified third univariate data set further comprises:
removing a single-point cluster that is outside of an outlier threshold from any adjacent multi-point cluster.

9. The method of claim 1, wherein clustering the sorted univariate data set according to the modified third univariate data set further comprises:

merging a single-point cluster with an adjacent multi-point cluster in response to the single-point cluster being within an outlier threshold from the adjacent multi-point cluster.

10. The method of claim 9, wherein the outlier threshold is less than or equal to two times a standard deviation of the adjacent multi-point cluster.

11. The method of claim 1, wherein each element of the set of clusters corresponds to a difference between consecutive elements in the modified third univariate data set.

12. The method of claim 11, wherein a number of clusters corresponds to a number of elements in the set of clusters.

13. The method of claim 11, wherein a value of an element indicating a cluster in the set of clusters defines a number of elements from the sorted univariate data set in the cluster.

14. The method of claim 1, wherein characterizing the new data point as anomalous further comprises:

comparing the new data point to an anomaly threshold of respective clusters;
determining that the new data point is outside of the anomaly threshold of each respective cluster; and
classifying the new data point as anomalous in response to determining that the new data point is outside of the anomaly threshold of each respective cluster.

15. The method of claim 14, wherein a first anomaly threshold of a first cluster comprises a standard deviation of first cluster.

16. The method of claim 1, wherein the method is performed by an anomaly detection system executing program instructions, wherein the program instructions were downloaded from a remote data processing system.

17. A computer program product comprising a computer readable storage medium having program instructions embodied therewith, the program instructions executable by a processor to cause the processor to perform a method comprising:

generating a clustering model based on unsupervised learning, the clustering model for data point classification, and the generating comprising:
sorting a univariate data set, comprising n number of elements, in numeric order to generate a sorted univariate data set;
generating a second univariate data set, comprising fewer than n number of elements, based on the sorted univariate data set, wherein respective elements in the second univariate data set correspond to respective differences between consecutive elements in the sorted univariate data set, and wherein the second univariate data set is indexed;
sorting the second univariate data set in numeric order according to the respective differences to generate a sorted second univariate data set;
generating a third univariate data set that includes index values corresponding to respective differences in the sorted second univariate data set that are above a threshold;
modifying the third univariate data set by sorting the third univariate data set in numeric order, appending a first new value at an initial position of the third univariate data set, the first new value being 0, and appending a second new value at a final position of the third univariate data set, the second new value being n, to generate a modified third univariate data set comprising values of the third univariate set as well as the appended first new value and second new value;
defining a set of clusters based on the modified third univariate data set; and
clustering the sorted univariate data set according to the set of clusters;
wherein the generating the clustering model is independent of whether the univariate data set is classified as anomalous or non-anomalous; and
using the general clustering model in characterizing a new data point as anomalous.

18. The computer program product of claim 17, wherein each element of the set of clusters corresponds to a difference between consecutive elements in the modified third univariate data set, wherein a number of clusters corresponds to a number of elements in the set of clusters, and wherein a value of each element in the set of clusters indicates a number of elements from the sorted univariate data set in each cluster.

19. A system comprising:

a processor; and
a computer-readable storage medium storing program instructions which, when executed by the processor, are configured to cause the processor to perform a method comprising:
generating a clustering model based on unsupervised learning, the clustering model for data point classification, and the generating comprising:
sorting a univariate data set, comprising n number of elements, in numeric order to generate a sorted univariate data set;
generating a second univariate data set, comprising fewer than n number of elements, based on the sorted univariate data set, wherein respective elements in the second univariate data set correspond to respective differences between consecutive elements in the sorted univariate data set, and wherein the second univariate data set is indexed;
sorting the second univariate data set in numeric order according to the respective differences to generate a sorted second univariate data set;
generating a third univariate data set that includes index values corresponding to respective differences in the sorted second univariate data set that are above a threshold;
modifying the third univariate data set by sorting the third univariate data set in numeric order, appending a first new value at an initial position of the third univariate data set, the first new value being 0, and appending a second new value at a final position of the third univariate data set, the second new value being n, to generate a modified third univariate data set comprising values of the third univariate data set as well as the appended first new value and second value;
defining a set of clusters based on the modified third univariate data set; and
clustering the sorted univariate data set according to the set of clusters;
wherein the generating the clustering model is independent of whether the univariate data set is classified as anomalous or non-anomalous; and
using the generated clustering model in characterizing a new data point as anomalous.

20. The system of claim 19, wherein the univariate data set includes a number of elements, n, wherein the second univariate data set comprises n−1 elements, wherein the third univariate data set comprises K elements, wherein the K elements is less than or equal to n/2, wherein the modified third univariate data set comprises K+2 elements, and wherein the set of clusters includes K+1 clusters.

* * * * *